(12) United States Patent
Ishii

(10) Patent No.: US 6,930,831 B2
(45) Date of Patent: Aug. 16, 2005

(54) VARI-FOCAL POLAR ALIGNMENT SCOPE

(75) Inventor: Shinichiro Ishii, Saitama (JP)

(73) Assignee: PENTAX Corporation, Tokyo (JP)

( * ) Notice: Subject to any disclaimer, the term of this patent is extended or adjusted under 35 U.S.C. 154(b) by 4 days.

(21) Appl. No.: 10/759,158

(22) Filed: Jan. 20, 2004

(65) Prior Publication Data

US 2004/0145818 A1 Jul. 29, 2004

(30) Foreign Application Priority Data

Jan. 21, 2003 (JP) ........................................ 2003-012397

(51) Int. Cl.$^7$ ........................... G02B 23/00; G02B 15/14
(52) U.S. Cl. ........................ 359/422; 359/399; 359/423; 359/430; 359/689
(58) Field of Search ................................ 359/379, 380, 359/399, 422, 423, 429, 430, 685, 689

(56) References Cited

U.S. PATENT DOCUMENTS

| | | | |
|---|---|---|---|
| 3,030,563 A | 4/1962 | Gordon | 318/657 |
| 5,321,457 A | 6/1994 | Imaizumi | 359/379 |
| 5,363,163 A | 11/1994 | Hayashi | 359/379 |
| 5,585,965 A | 12/1996 | Hayashi et al. | 359/431 |
| 5,956,177 A | 9/1999 | Nishikata et al. | 359/450 |
| 6,005,712 A | 12/1999 | Hayashi | 359/431 |
| 6,134,052 A | 10/2000 | Yano | 359/689 |
| 2004/0136061 A1 * | 7/2004 | Denpo et al. | 359/399 |

FOREIGN PATENT DOCUMENTS

JP 9-281408 10/1997

* cited by examiner

*Primary Examiner*—David N. Spector
(74) *Attorney, Agent, or Firm*—Greenblum & Bernstein, P.L.C.

(57) ABSTRACT

A vari-focal polar alignment scope includes an objective optical system, a relay optical system, and an eyepiece optical system, in that order from the object side. The relay optical system includes an erecting vari-focal viewing optical system, including a positive condenser lens element, and positive second and third relay lens groups which relatively move in the optical axis direction so as to vary the magnification of the polar alignment scope, wherein the following conditions (1), (2) and (3) are satisfied:

$$6.0 < f_o/fe < 10.0 \quad (1);$$
$$-4.0 < M_{2L} < -1.0 \quad (2); \text{ and}$$
$$0.2 < M_{3L} < 0.6 \quad (3); \text{ wherein}$$

$f_o$ designates the focal length of the objective optical system; fe designates the focal length of the eyepiece optical system; $M_{2L}$ designates the lateral magnification of the second lens group of the relay optical system at a low magnification; and $M_{3L}$ designates the lateral magnification of the third lens group of the relay optical system at a low magnification.

4 Claims, 10 Drawing Sheets

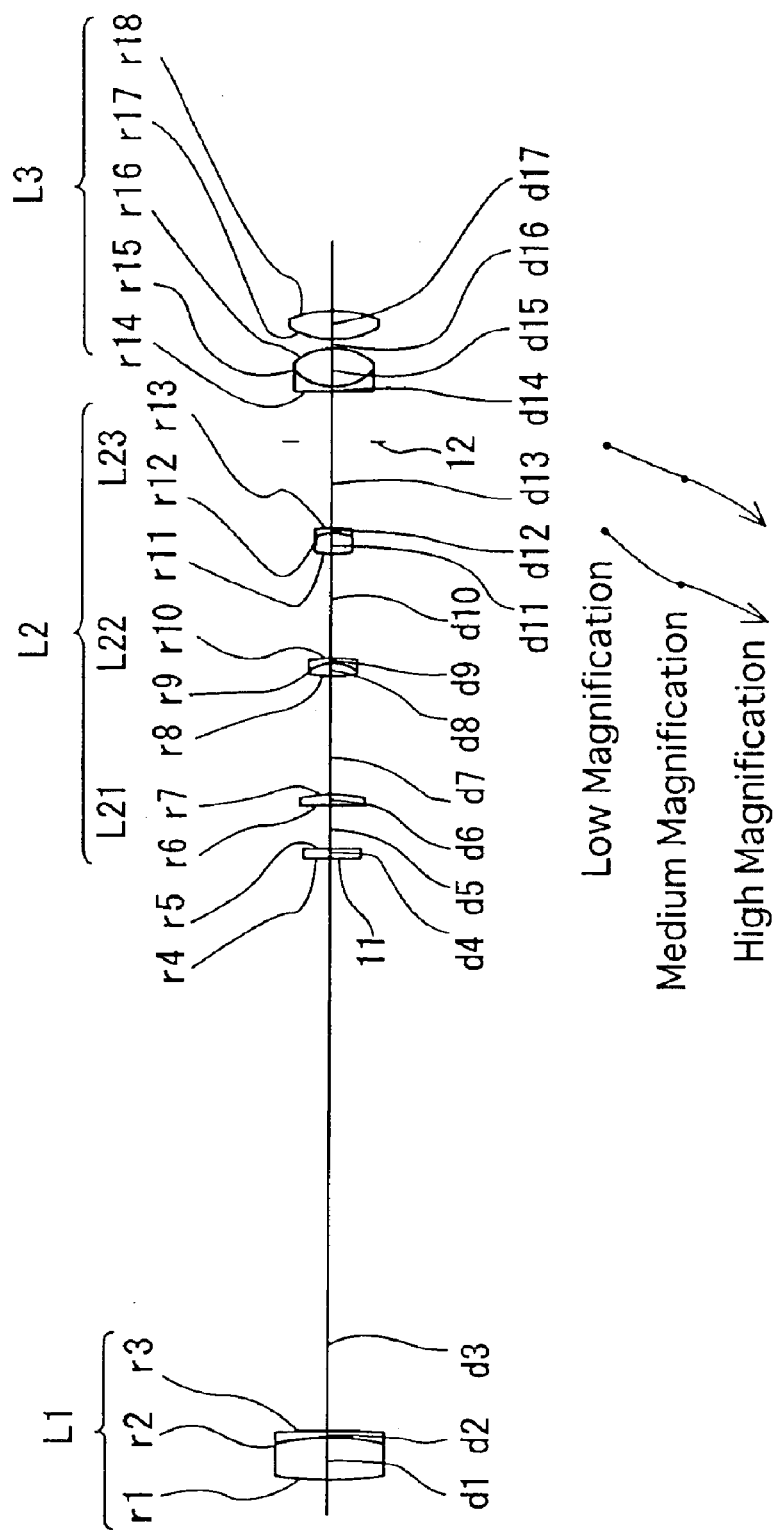

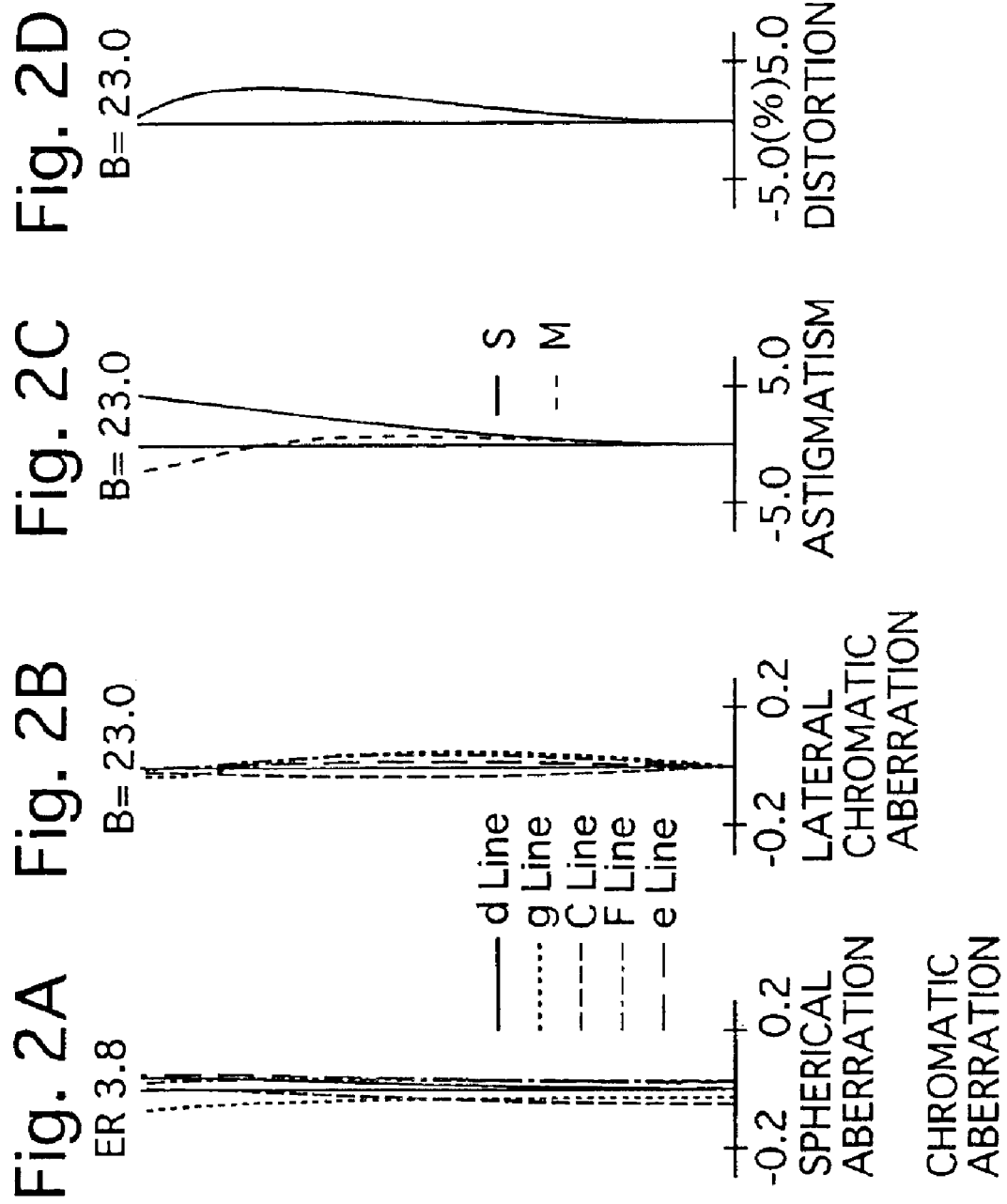

ER 2.7

—— d Line
········ g Line
– – – C Line
–·–·– F Line
— — e Line

-0.2  0.2
SPHERICAL
ABERRATION

CHROMATIC
ABERRATION

B= 23.0

-0.2  0.2
LATERAL
CHROMATIC
ABERRATION

B= 23.0

— S
-- M

-5.0  5.0
ASTIGMATISM

B= 23.0

-5.0(%)5.0
DISTORTION

ER 1.9

—— d Line
········ g Line
– – – C Line
–·–·– F Line
— — e Line

-0.2  0.2
SPHERICAL
ABERRATION

CHROMATIC
ABERRATION

B= 23.0

-0.2  0.2
LATERAL
CHROMATIC
ABERRATION

B= 23.0

— S
-- M

-5.0  5.0
ASTIGMATISM

B= 23.0

-5.0(%)5.0
DISTORTION

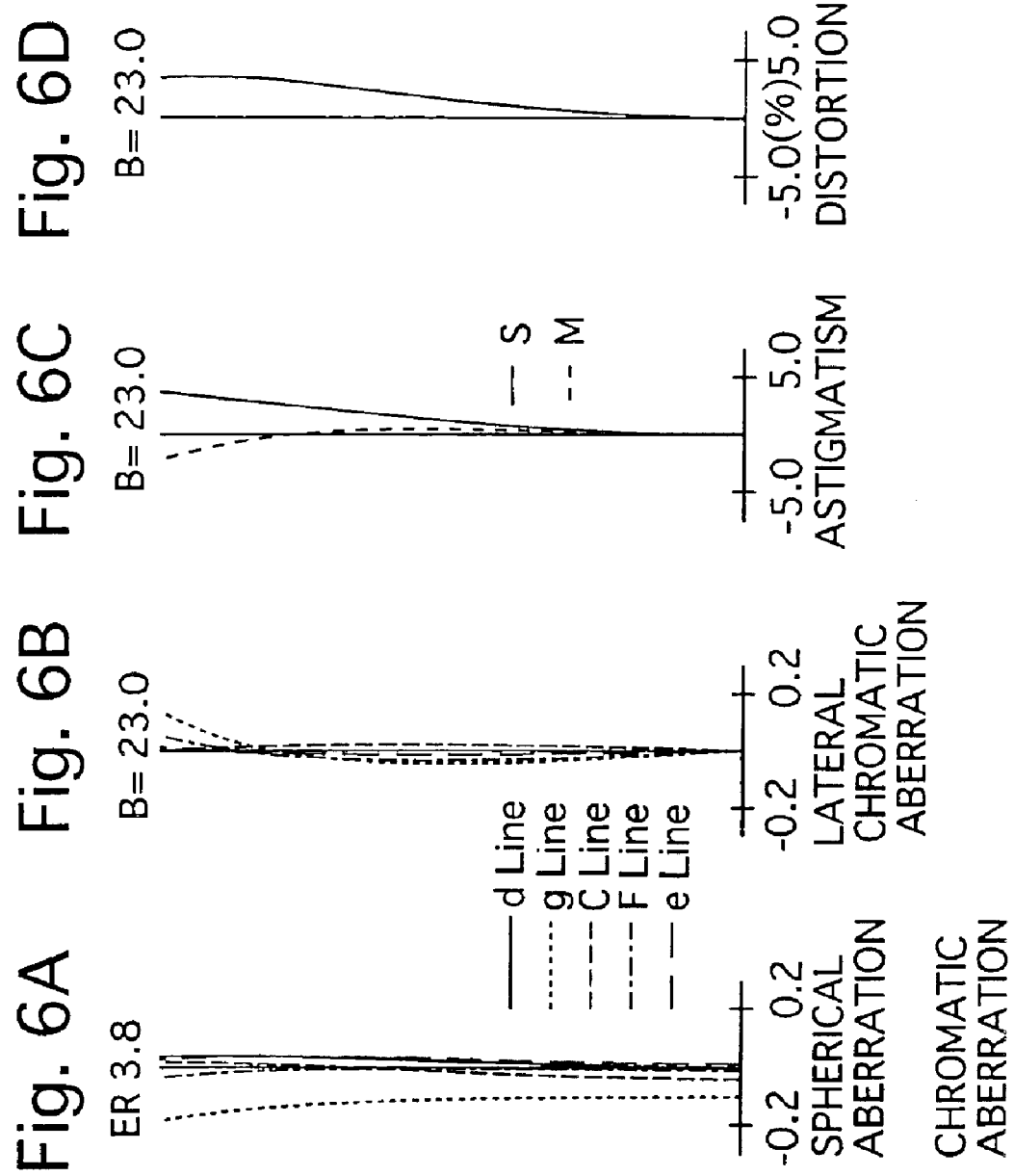

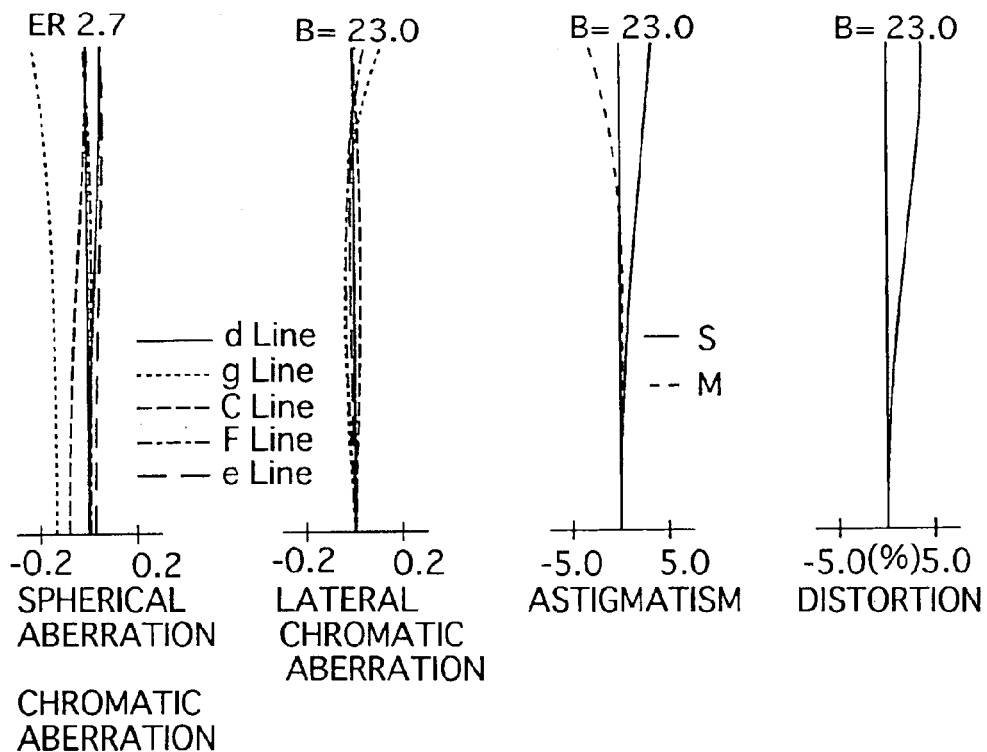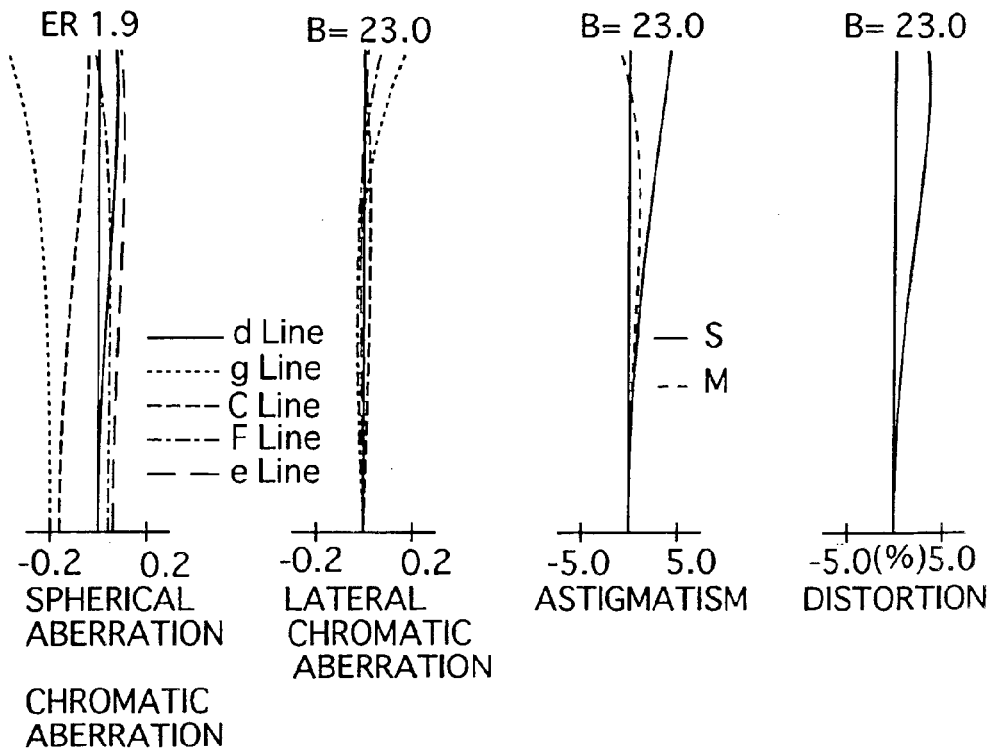

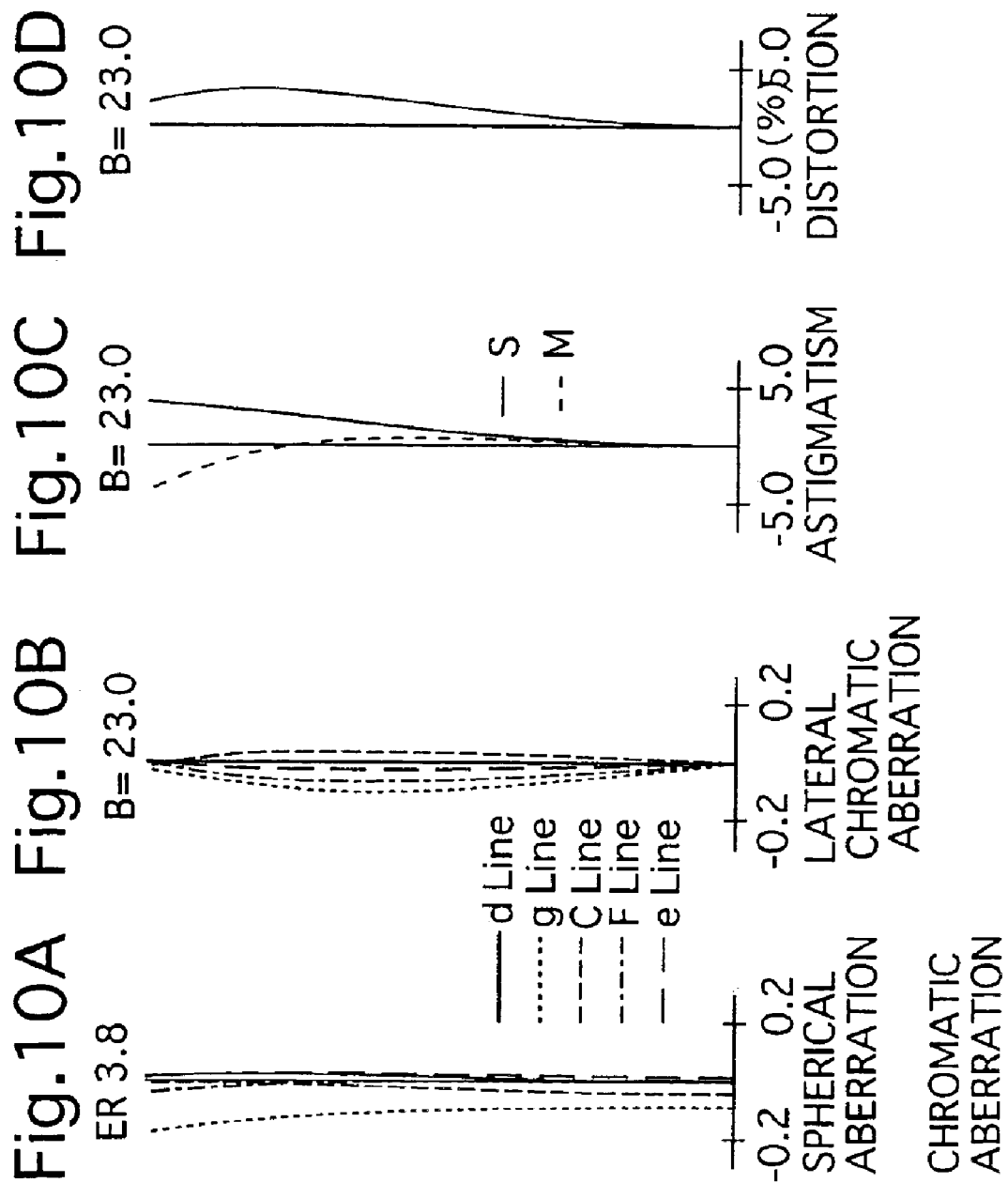

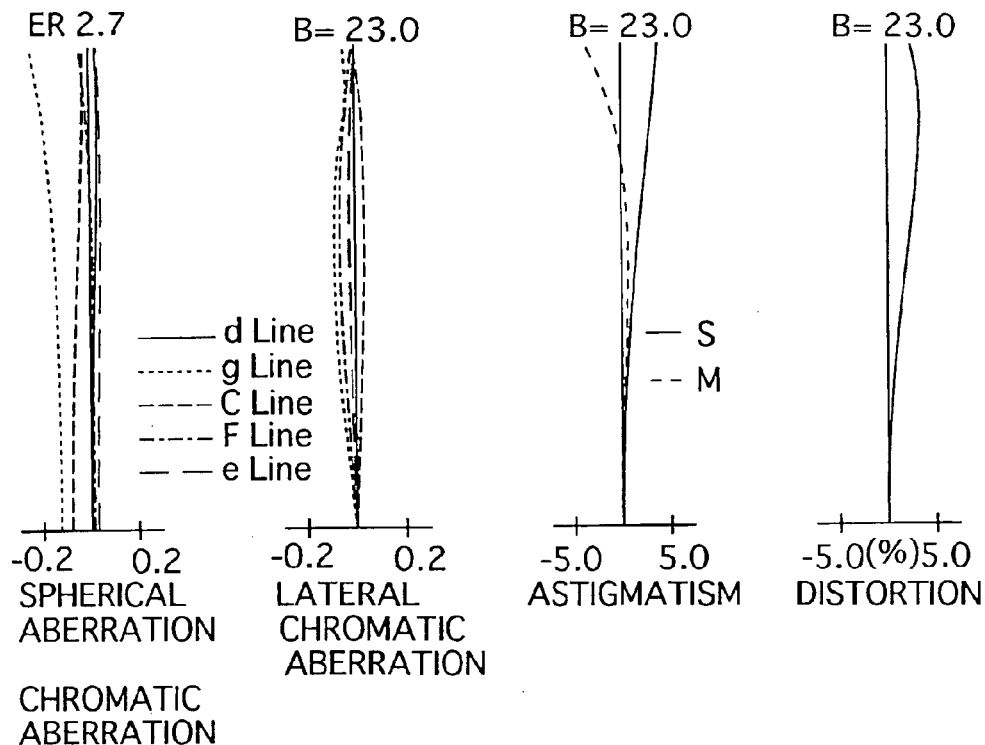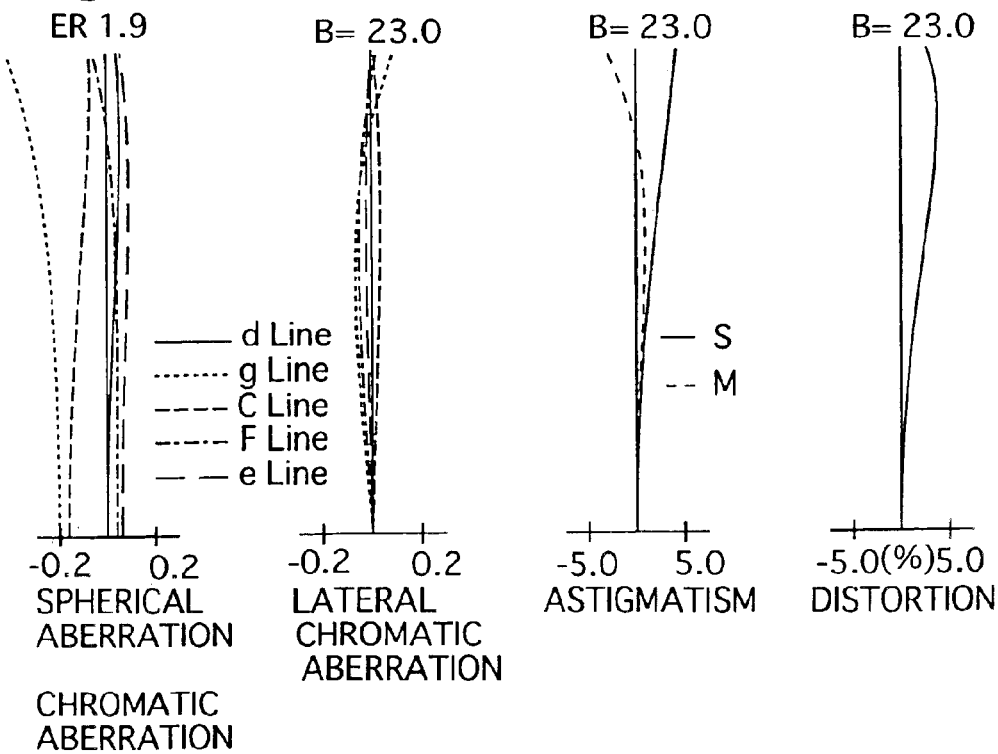

VARI-FOCAL POLAR ALIGNMENT SCOPE

BACKGROUND OF THE INVENTION

1. Field of the Invention

The present invention relates to a vari-focal polar alignment scope applied to an equatorial telescope for an astronomical telescope.

2. Description of the Prior Art

In an equatorial telescope for an astronomical telescope, it is necessary to set the polar axis parallel to the rotational axis of the earth (earth axis). An equatorial telescope having a polar alignment scope wherein the optical axis thereof is aligned with the polar axis in order to facilitate the polar alignment setting is known in the art. The polar axis setting of an equatorial telescope is carried out according to the following method. For example, in the northern hemisphere, the northern sky is observed with a polar alignment scope, and the orientation and high-precision adjustment of the equatorial telescope are carried out in order to set the position of the northern star at a predetermined position from the field-of-view center (optical axis) of the polar alignment scope.

Since the field-of-view is wide when the magnification of a polar alignment scope is low, a target celestial body can be easily guided within the field-of-view, however, the setting precision is low. Conversely, if the magnification is increased to a high level in order to increase the setting precision, the field-of-view becomes narrow, resulting in difficulty in guiding the target celestial body.

Consequently, the inventor of the present invention has proposed, in Japanese Unexamined Patent No. Hei-9-281408, a polar alignment scope which has a converter detachably attached thereto, or a converter which can be inserted and taken out of the optical path of the polar alignment scope, so as to change the magnification. However, it is preferable to provide a polar alignment scope having a wider real field-of-view and a greatly reduced amount of aberrations.

SUMMARY OF THE INVENTION

The present invention provides a polar alignment scope which can easily induce a target celestial body, e.g., the northern star (Polaris), and can provide a high-precision polar setting as required.

According to an aspect of the present invention, a vari-focal polar alignment scope including an objective optical system, a relay optical system which relays an image formed through the objective optical system to form a secondary image, and an eyepiece optical system for observing the secondary image, in that order from the object side. The relay optical system includes an erecting vari-focal viewing optical system, including a positive condenser lens element constituting a first relay lens group, a positive second relay lens group, and a positive third relay lens group, wherein the second and third relay lens groups relatively move in a direction along the optical axis thereof so as to vary the magnification of the polar alignment scope, wherein the following conditions (1), (2) and (3) are satisfied:

$$6.0 < f_o/fe < 10.0 \quad (1);$$

$$-4.0 < M_{2L} < -1.0 \quad (2); \text{ and}$$

$$0.2 < M_{3L} < 0.6 \quad (3);$$

wherein $f_o$ designates the focal length of the objective optical system; fe designates the focal length of the eyepiece optical system; $M_{2L}$ designates the lateral magnification of the second lens group of the relay optical system at a low magnification; and $M_{3L}$ designates the lateral magnification of the third lens group of the relay optical system at a low magnification.

It is desirable for a target plate having a scale thereon for setting the polar axis to be provided at an imaging point of the objective optical system.

It is desirable for the second relay lens group to include a cemented lens having a positive biconvex lens element and a negative meniscus lens element, in that order from the object side.

It is desirable for the third relay lens group to include a cemented lens having a positive biconvex lens element and a negative meniscus lens element, in that order from the object side.

The present disclosure relates to subject matter contained in Japanese Patent Application No. 2003-12397 (filed on Jan. 21, 2003) which is expressly incorporated herein in its entirety.

BRIEF DESCRIPTION OF THE DRAWINGS

The present invention will be discussed below in detail with reference to the accompanying drawings, in which:

FIG. 1 is a lens diagram of the first embodiment of a polar alignment scope at a low magnification, according to the present invention;

FIGS. 2A, 2B, 2C and 2D show various aberrations of the first embodiment at a low magnification;

FIGS. 6A, 6B, 6C and 6D show various aberrations of the second embodiment at a low magnification;

FIGS. 7A, 7B, 7C and 7D show various aberrations of the second embodiment at a medium magnification;

FIGS. 8A, 8B, 8C and 8D show various aberrations of the second embodiment at a high magnification;

FIGS. 10A, 10B, 10C and 10D show various aberrations of the third embodiment at a low magnification;

FIGS. 11A, 11B, 11C and 11D show various aberrations of the third embodiment at a medium magnification;

FIGS. 12A, 12B, 12C and 12D show various aberrations of the third embodiment at a high magnification.

DESCRIPTION OF THE PREFERRED EMBODIMENTS

Figure 13:
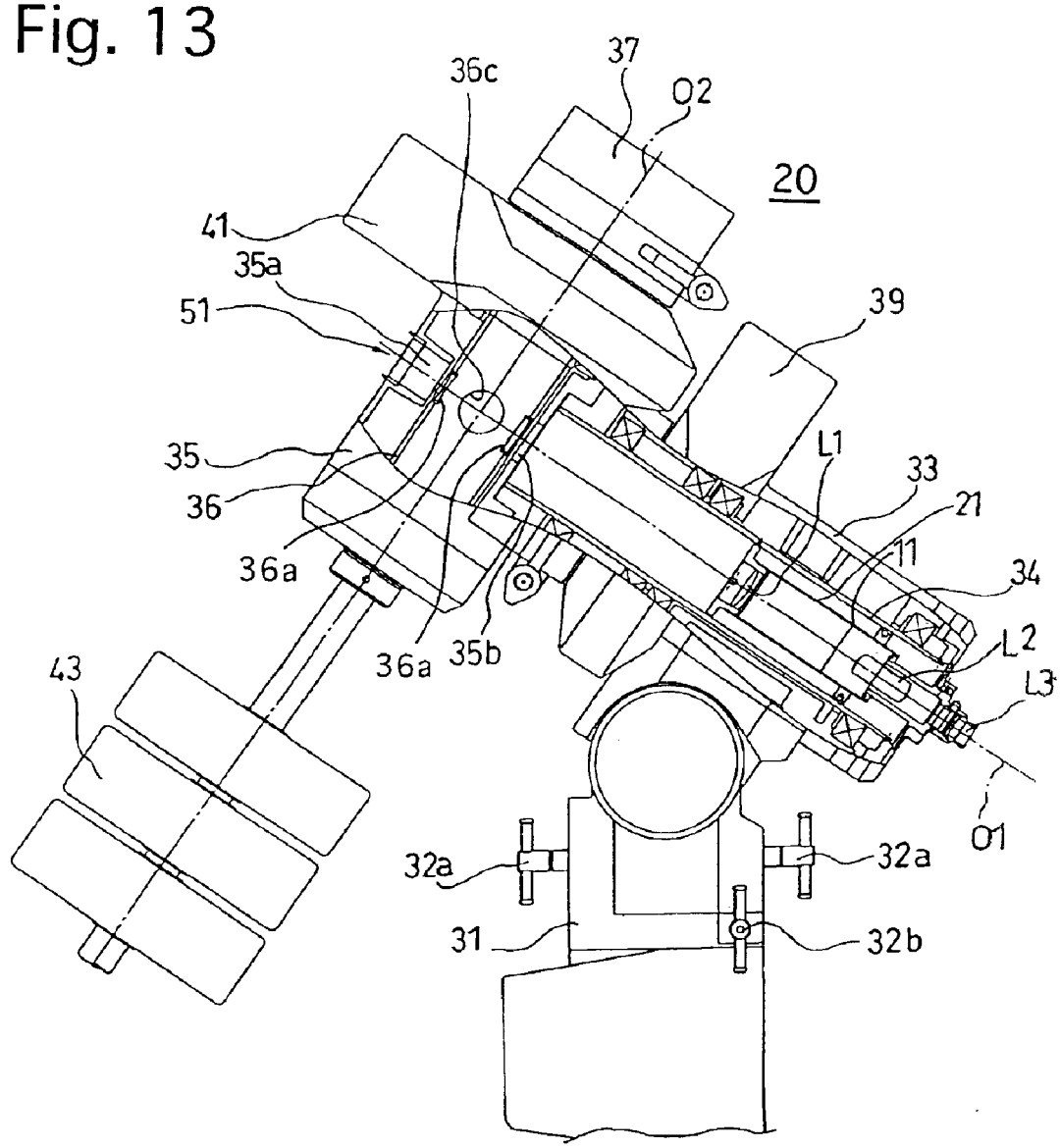
FIG. 13 shows an equatorial telescope having the polar alignment scope of the present invention, showing part of the main components in vertical section.

FIG. 13 shows an equatorial telescope having a (vari-focal) polar alignment scope 21 of the present invention, showing part of the main components in vertical section.

The equatorial telescope 20 includes a pedestal 31 for attaching to a tripod (not shown), a polar alignment outer barrel 33 which is supported and pivoted so as to have an adjustable altitude (i.e., rotatable in a vertical direction) and an adjustable azimuth (i.e., rotatable in a horizontal direction), a polar alignment inner barrel 34 which is supported to be rotatable about the polar axis O1 within the polar alignment outer barrel 33, a declination outer barrel 35 which is fixed to an front end portion of the polar alignment inner barrel 34, a declination inner barrel 36 which is provided within the upper end portion of the declination outer barrel 35 so as to be rotatable about a declination axis O2 which intersects with the polar axis O1 within the declination outer barrel 35, and a mount 37 which is provided on the upper end of the declination outer barrel 35 and is rotatable about the declination axis O2. An astronomical telescope (not shown) is fixed on the mount 37.

A polar alignment scope 21, the optical axis of which is aligned with the polar axis O1, is provided in the polar alignment inner barrel 34. In order to obtain the field-of-view of the polar alignment scope 21, apertures 35a, 36a, 36b and 35b are provided in the declination outer barrel 35 and in the declination inner barrel 36.

The polar alignment scope 21 includes an objective optical system L1, a relay optical system L2, and an eyepiece optical system L3; and a target plate 11 having a scale printed thereon for deciding the position of a target star, etc., is provided in between the objective optical system L1 and the relay optical system L2. When a polar axis setting is performed, the user observes the Polaris with respect to the scale (of the target plate 11), via the eyepiece optical system L3, and operates an altitude fine-adjustment screw 32a and an azimuth fine-adjustment screw 32b to perform altitude (vertical) adjustment and azimuth (horizontal) adjustment of the polar alignment scope 21 in order align the Polaris with the scale.

Note that in the drawings, designator 39 is a polar axis drive unit for rotating the declination outer barrel 35 about the polar axis O1, designator 41 is a declination drive unit for rotating the mount 37 about the declination axis O2, and designator 43 is a balance weight.

The equatorial telescope is used in the following manner. The user (observer) firstly points the polar alignment scope 21 in the direction of the Polaris. At this stage, the magnification of the polar alignment scope 21 is set at a low magnification. Thereafter, the constellation is acquired via the eyepiece optical system L3, and the altitude (vertical direction) and the azimuth (horizontal direction) of the polar alignment scope 21 is roughly adjusted so that the Polaris is approximately at the center of the field-of-view.

Once the Polaris is positioned at the approximate center of the field-of-view, the magnification of the polar alignment scope 21 is varied to a high magnification in order for high-magnification observation to be possible. Thereafter, the user observes the Polaris with respect to the scale (of the target plate 11), via the eyepiece optical system L3, and operates the altitude fine-adjustment screw 32a and the azimuth fine-adjustment screw 32b to perform altitude adjustment and azimuth adjustment of the polar alignment scope 21 in order align the Polaris with the scale.

In the equatorial telescope 20 having the polar alignment scope 21, as shown in FIG. 13, since the magnification of the polar alignment scope 21 can be varied, by lowering the magnification of the polar alignment scope 21 when a polar axis setting is carried out so as to widen the real field-of-view, a target celestial body can be easily acquired by observing within this widened real field-of-view. Furthermore, upon a target celestial body being acquired, by increasing the magnification of the alignment scope 21, a high precision polar axis setting can be carried out by observing the target celestial body with the polar alignment scope 21 having a high magnification and high precision.

Specific numerical embodiments will be herein discussed. In the aberration diagrams, a d-line, g-line and C-line at their respective wave-lengths show chromatic aberration (axial chromatic aberration) and magnification chromatic aberration due to spherical aberration; an F-line and an e-line show aberrations at their respective wavelengths; and S and M show sagittal and meridional astigmatism, respectively. ER designates the pupil diameter, and B (γ) designates the exit angle (half angle). Furthermore, W designates the half angle of view (γ), r designates the radius of curvature, d designates the lens thickness or distance between lenses, $N_d$ designates the refractive index of the d-line, and ν d designates the Abbe constant.

[Embodiment 1]

FIG. 1 shows a lens diagram of the first embodiment according to the present invention. FIGS. 2A, 2B, 2C and 2D shown various aberrations at a low magnification, FIGS. 3A, 3B, 3C and 3D show various aberrations at a medium magnification, and FIGS. 4A, 4B, 4C and 4D show various aberrations at a high magnification. Table 1 shows the numerical data of the first embodiment. Surface Nos. 1 through 5 designate the objective optical system L1 and the target plate 11, surface Nos. 6 through 13 designate a relay optical system L2, and surface Nos. 14 through 18 designate an eyepiece optical system L3.

The objective optical system L1 is a cemented lens having a positive lens element L11 and a negative lens element L12, and the imaging point (first imaging point) of the objective optical system L1 is located on the target plate 11. The relay optical system L2 is constructed from a positive condenser lens L21, constituting a first relay lens group, and second and third relay lens groups L22 and L23 which are each constructed from a cemented lens having a positive biconvex lens and a negative meniscus lens. The second and third relay lens groups L22 and L23 relatively move along the optical axis thereof in order to vary the magnification of the polar alignment scope. The imaging point of the relay optical system L2 is located at a field ring 12. The eyepiece optical system L3, which is located behind the field ring 12, is constructed from a cemented lens having a positive lens element and a negative lens element, and a positive lens element. The imaging point (second imaging point) of the relay optical system L2 is located 8.01 mm on the object side of surface No. 14.

TABLE 1

| Surf. No. | r | d | N(d) | νd |
|---|---|---|---|---|
| 1 | 112.028 | 13.49 | 1.51633 | 64.1 |
| 2 | −78.691 | 1.90 | 1.62004 | 36.3 |
| 3 | −311.112 | 179.99 | | |
| 4 | ! | 3.00 | 1.51633 | 64.1 |
| 5 | ! | 13.28 | | |
| 6 | ! | 3.50 | 1.51633 | 64.1 |
| 7 | −38.933 | d7 | | |
| 8 | 45.799 | 4.16 | 1.58913 | 61.2 |
| 9 | −12.000 | 1.50 | 1.64769 | 33.8 |
| 10 | −44.916 | d10 | | |
| 11 | 32.762 | 6.27 | 1.51633 | 64.1 |
| 12 | −17.000 | 1.50 | 1.64769 | 33.8 |
| 13 | −55.408 | d13 | | |
| 14 | 1379.037 | 1.50 | 1.80518 | 25.4 |
| 15 | 17.303 | 11.83 | 1.51633 | 64.1 |
| 16 | −19.266 | 2.64 | | |
| 17 | 27.234 | 9.04 | 1.51633 | 64.1 |
| 18 | −38.224 | — | | |
| W | 2.7 | 1.9 | 1.3 | |
| d7 = | 37.47 | 24.25 | 14.88 | |
| d10 = | 32.71 | 33.78 | 25.94 | |
| d13 = | 43.27 | 55.42 | 72.64 | |

[Embodiment 2]

Figure 3A:
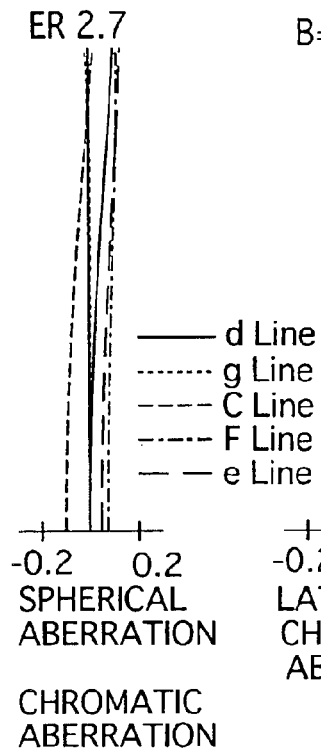
FIGS. 3A, 3B, 3C and 3D show various aberrations of the first embodiment at a medium magnification.
Figure 3B:
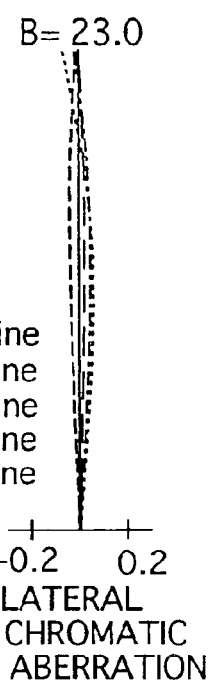
Figure 3C:
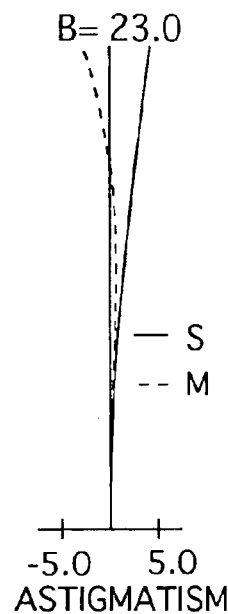
Figure 3D:
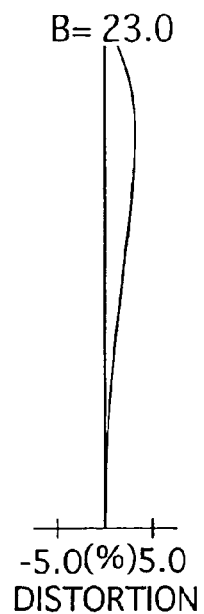
Figure 4A:
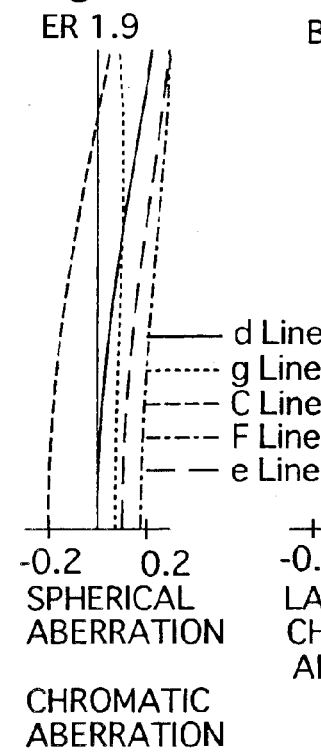
FIGS. 4A, 4B, 4C and 4D show various aberrations of the first embodiment at a high magnification.
Figure 4B:
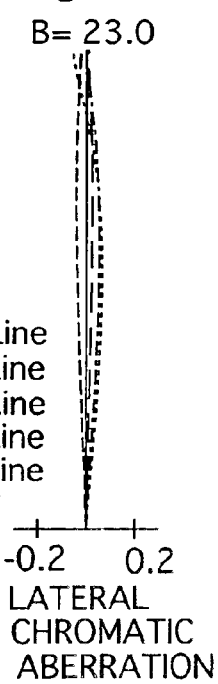
Figure 4C:
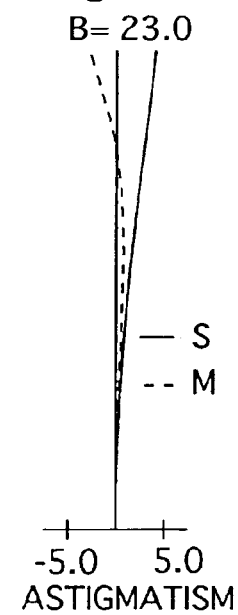
Figure 4D:
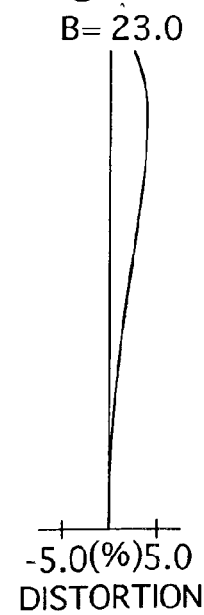
Figure 5:
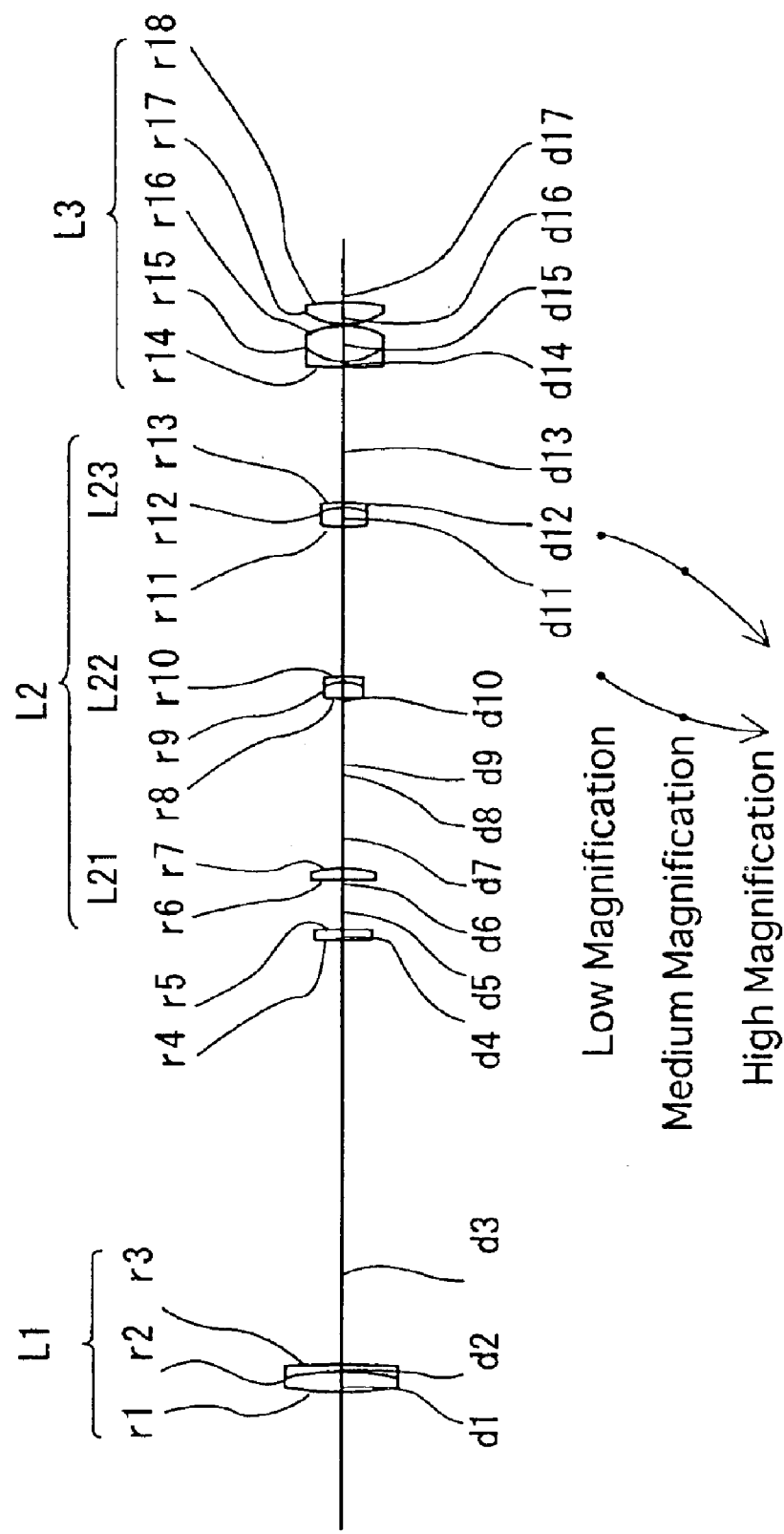
FIG. 5 is a lens diagram of the second embodiment of a polar alignment scope at a low magnification, according to the present invention.

FIG. 5 shows a lens diagram of the second embodiment according to the present invention. FIGS. 6A, 6B, 6C and 6D shown various aberrations at a low magnification, FIGS. 7A, 7B, 7C and 7D show various aberrations at a medium magnification, and FIGS. 8A, 8B, 8C and 8D show various aberrations at a high magnification. Table 2 shows the numerical data of the second embodiment. Surface Nos. 1 through 5 designate the objective optical system L1 and the target plate 11, surface Nos. 6 through 13 designate a relay optical system L2, and surface Nos. 14 through 18 designate an eyepiece optical system L3.

The fundamental lens construction of the second embodiment is the same as that of the first embodiment. The imaging point (second imaging point) of the relay optical system L2 is located 11.07 mm on the object side of surface No. 14.

TABLE 2

| Surf. No. | r | d | N(d) | vd |
|---|---|---|---|---|
| 1 | 111.000 | 6.00 | 1.51633 / 64.1 | |
| 2 | −77.480 | 2.00 | 1.62004 / 36.3 | |
| 3 | −306.600 | 181.95 | | |
| 4 | ! | 3.00 | 1.51633 / 64.1 | |
| 5 | ! | 15.33 | | |
| 6 | ! | 3.50 | 1.51633 / 64.1 | |
| 7 | −39.088 | d7 | | |
| 8 | 46.901 | 5.00 | 1.58913 / 61.2 | |
| 9 | −12.987 | 1.50 | 1.64769 / 33.8 | |
| 10 | −44.000 | d10 | | |
| 11 | 44.200 | 6.00 | 1.48749 / 70.2 | |
| 12 | −17.790 | 1.50 | 1.64769 / 33.8 | |
| 13 | −53.554 | d13 | | |
| 14 | 646.382 | 1.50 | 1.84666 / 23.8 | |
| 15 | 17.608 | 11.00 | 1.60311 / 60.7 | |
| 16 | −24.079 | 0.30 | | |
| 17 | 21.649 | 6.50 | 1.51633 / 64.1 | |
| 18 | −68.000 | — | | |
| W | 2.6 | 1.9 | 1.3 | |
| d7 = | 51.09 | 34.67 | 20.48 | |
| d10 = | 45.25 | 48.39 | 38.50 | |
| d13 = | 40.54 | 53.82 | 77.90 | |

[Embodiment 3]

Figure 9:
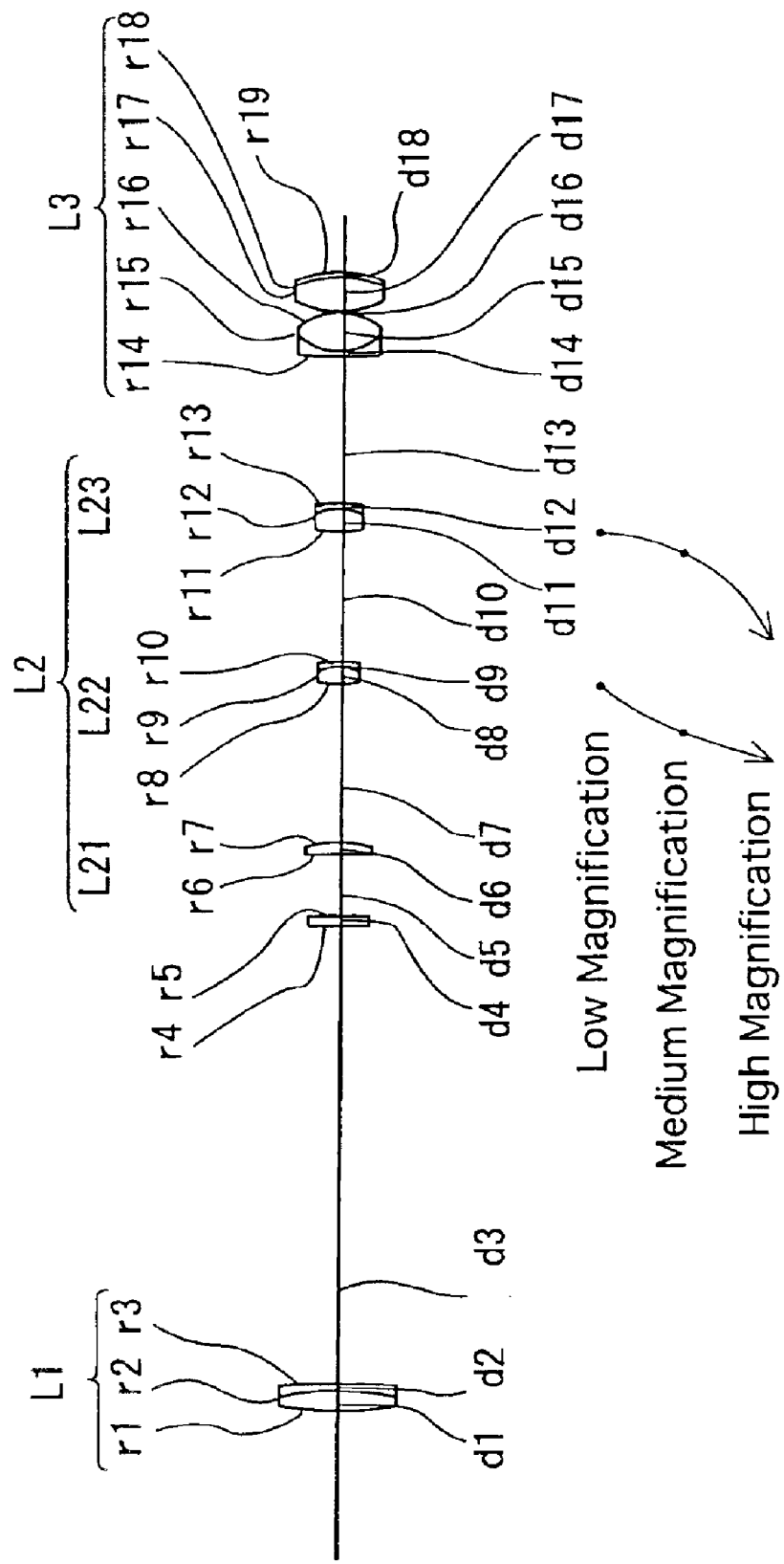
FIG. 9 is a lens diagram of the third embodiment of a polar alignment scope at a low magnification, according to the present invention.

FIG. 9 shows a lens diagram of the third embodiment according to the present invention. FIGS. 10A, 10B, 10C and 10D shown various aberrations at a low magnification, FIGS. 11A, 11B, 11C and 11D show various aberrations at a medium magnification, and FIGS. 12A, 12B, 12C and 12D show various aberrations at a high magnification. Table 3 shows the numerical data of the third embodiment. Surface Nos. 1 through 5 designate the objective optical system L1 and the target plate 11, surface Nos. 6 through 13 designate a relay optical system L2, and surface Nos. 14 through 18 designate an eyepiece optical system L3.

The construction of the objective optical system L1 and the relay optical system L2 of the third embodiment is the same as that of the first embodiment. The eyepiece optical system L3 is constructed from a cemented lens having a positive lens element and a negative lens element. The imaging point (second imaging point) of the relay optical system L2 is located 8.90 mm on the object side of surface No. 14.

TABLE 3

| Surf. No. | r | d | N(d) | vd |
|---|---|---|---|---|
| 1 | 109.216 | 6.00 | 1.51633 / 64.1 | |
| 2 | −76.421 | 2.00 | 1.62004 / 36.3 | |
| 3 | −305.975 | 175.40 | | |
| 4 | ! | 3.00 | 1.51633 / 64.1 | |
| 5 | ! | 17.96 | | |
| 6 | ! | 3.50 | 1.51633 / 64.1 | |
| 7 | −37.062 | d7 | | |
| 8 | 47.418 | 5.00 | 1.58913 / 61.2 | |
| 9 | −12.985 | 1.50 | 1.64769 / 33.8 | |
| 10 | −43.188 | d10 | | |

TABLE 3-continued

| Surf. No. | r | d | N(d) | vd |
|---|---|---|---|---|
| 11 | 37.592 | 6.50 | 1.48749 / 70.2 | |
| 12 | −17.782 | 1.50 | 1.64769 / 33.8 | |
| 13 | −59.810 | d13 | | |
| 14 | 176.829 | 1.50 | 1.84666 / 23.8 | |
| 15 | 17.604 | 11.00 | 1.48749 / 70.2 | |
| 16 | −19.643 | 0.30 | | |
| 17 | 27.621 | 10.00 | 1.51633 / 64.1 | |
| 18 | −34.817 | 1.50 | 1.80518 / 25.4 | |
| 19 | −33.602 | — | | |
| W | 2.6 | 1.9 | 1.3 | |
| d7 = | 46.14 | 31.75 | 20.31 | |
| d10 = | 38.11 | 39.10 | 29.54 | |
| d13 = | 42.89 | 56.30 | 77.69 | |

As shown in Table 4 below, the numerical values of the first, second and third embodiments satisfy each of conditions (1), (2), and (3).

TABLE 4

| | Embodiment 1 | Embodiment 2 | Embodiment 3 |
|---|---|---|---|
| Condition (1) | 8.88 | 8.90 | 8.59 |
| Condition (2) | −3.24 | −1.44 | −1.86 |
| Condition (3) | 0.25 | 0.54 | 0.44 |

In the (vari-focal) polar alignment scope 21 of the first through third embodiments, the focal length $f_o$ of the objective optical system is short, has a wide real field-of-view, mounting precision of the target plate 11 is slackened, the magnification of the optical system from the relay optical system rearwards can be set low, and appropriate aberration correction can be performed. Furthermore, the overall length of the entire optical system (i.e., the polar alignment scope 21) can be shortened, and a large diameter can be avoided in the relay optical system, and coma aberration can be appropriately corrected.

As can be understood from the above description, according to the vari-focal polar alignment scope of the present invention, since the magnification of the polar alignment scope can be varied, a target celestial body can be easily acquired via observation, and furthermore, a high precision polar axis setting can be performed via observation upon varying the magnification to a high magnification.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A vari-focal polar alignment scope comprising;

an objective optical system, a relay optical system which relays an image formed through said objective optical system to form a secondary image, and an eyepiece optical system for observing said secondary image, in that order from the object side;

wherein said relay optical system comprises an erecting vari-focal viewing optical system, including a positive condenser lens element constituting a first relay lens group, a positive second relay lens group, and a positive third relay lens group, wherein said second and third relay lens groups relatively move in a direction along the optical axis thereof so as to vary the magnification of said polar alignment scope, wherein the following conditions (1), (2) and (3) are satisfied:

$$6.0 < f_o/fe < 10.0 \quad (1);$$

$$-4.0 < M_{2L} < -1.0 \quad (2);\text{ and}$$

$$0.2 < M_{3L} < 0.6 \quad (3);\text{ wherein}$$

$f_o$ designates the focal length of said objective optical system;

fe designates the focal length of said eyepiece optical system;

$M_{2L}$ designates the lateral magnification of said second lens group of said relay optical system at a low magnification; and $M_{3L}$ designates the lateral magnification of said third lens group of said relay optical system at a low magnification.

2. The vari-focal polar alignment scope according to claim 1, wherein a target plate having a scale thereon for setting the polar axis is provided at an imaging point of said objective optical system.

3. The vari-focal polar alignment scope according to claim 1, wherein said second relay lens group comprises a cemented lens having a positive biconvex lens element and a negative meniscus lens element, in that order from the object side.

4. The vari-focal polar alignment scope according to claim 1, wherein said third relay lens group comprises a cemented lens having a positive biconvex lens element and a negative meniscus lens element, in that order from the object side.

* * * * *